June 21, 1960
C. W. HARRISON
2,942,174
REGULATED VOLTAGE SUPPLY
Filed March 18, 1957
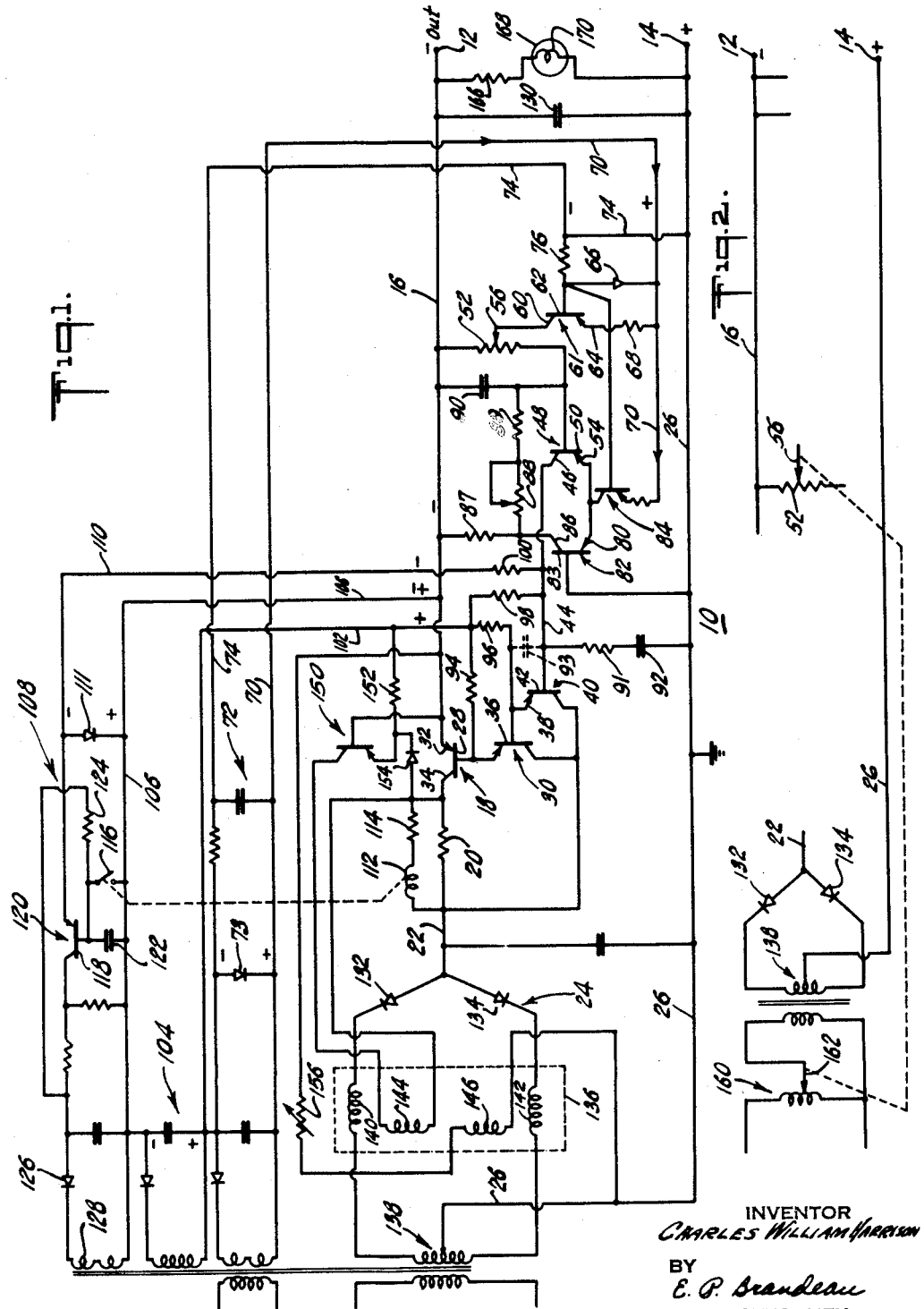
INVENTOR
CHARLES WILLIAM HARRISON
BY
E. P. Brandeau
ATTORNEY United States Patent Office 2,942,174
Patented June 21, 1960

2,942,174

REGULATED VOLTAGE SUPPLY

Charles William Harrison, Long Hill Road, Millington, N.J.

Filed Mar. 18, 1957, Ser. No. 646,764

9 Claims. (Cl. 323—22)

This invention relates to a regulated direct-voltage power supply.

An object of this invention is to provide apparatus having improved efficiency in regulating an output direct voltage, especially relatively low voltage at high current.

A further object is to provide such apparatus which is very stable in operation and relatively simple and inexpensive in construction, but yet which is able to keep a voltage, from zero to full load, within an exceedingly small percentage of a desired value.

A more specific object is to provide a practical and effective voltage regulating circuit which uses present day, commercially available transistors, in spite of their shortcomings and limitations, and gives performance equal or better than that obtained with existing circuits using vacuum tubes.

These and other objects will in part be understood from and in part pointed out in the description given hereinafter.

In regulating the direct output voltage from a source it is customary to amplify variations in the output voltage and then apply these amplified variations in proper phase to a control element to correct the output voltage and keep it within close limits of a given value. One common kind of control element is a vacuum tube or tubes connected as a resistance in series with the source and the output voltage terminals, the grid or control electrode of the tube being changed in potential as required to keep the output voltage substantially constant.

A circuit using vacuum tubes in this way to regulate a voltage is well suited to applications requiring relatively very fast regulating action. However, because vacuum tubes require sizeable voltages for proper operation, they are not very well suited to regulators intended for relatively low voltages. Moreover, because vacuum tubes operate with heated filaments, they must be replaced from time to time when they burn out and they require appreciable stand-by power even at no load thus lessening the power efficiency of the overall regulating circuit in which they are used. For these reasons, therefore, it is desirable to use transistors in regulators intended for certain applications.

Among the limitations of transistors is their susceptability to damage or destruction by excessive voltage or current. Further, the power handling capacity of even the largest present day transistors is low in comparison with vacuum tubes. Moreover, under widely varying loads the internal heating of a transistor will change and cause a consequent drift in its amplification characteristics. In spite of these drawbacks, because of the compactness and long life, the possibility of operation without a heated cathode and with low voltages, the use of transistors in voltage regulators for many applications appears highly desirable.

The present invention seeks to provide an all transistor voltage regulating circuit in which the previous shortcomings of transistors are either overcome or else entirely minimized. In one regulating circuit embodying features of the invention very nearly perfect voltage regulating efficiency is obtained over a range, for example, of 2 to 30 volts and 0 to 2 amperes. Even so, the electrical elements required are relatively few and inexpensive. The power efficiency of the circuit at minimum output voltage is quite high and operation is completely stable throughout a wide range of conditions including suddenly applied loads. The physical size of the circuit is very compact and the whole structure can be operated in crowded, poorly ventilated places.

In accordance with the present invention an output voltage lead is connected to an input direct voltage source through the collector and emitter electrodes of a regulating transistor. The base electrode of the transistor is connected through an all transistor voltage amplifying network to the output lead and controlled to maintain the output constant at a predetermined value determined by an adjustable bias applied in a unique way to the network. To prevent excessive power dissipation in the series regulating transistor, the voltage on the input lead is also controlled to keep the collector-emitter voltage difference of the regulating transistor effectively constant.

A better understanding of the invention together with a fuller appreciation of its many advantages will best be gained from the following detailed description given in connection with the accompanying drawings in which:

Figure 1 is a circuit diagram of a regulated voltage supply embodying features of the invention; and Figure 2 shows a modified portion of the circuit in Figure 1.

Referring to Figure 1, the regulated voltage supply circuit 10 has two output voltage terminals 12 and 14, upper terminal 12 being held at a negative potential relative to the lower terminal 14. Terminal 12 is connected to an output lead or conductor 16 which in turn is connected through the series regulating transistor 18 and the small resistor 20 to a direct-voltage input lead 22. This lead is in turn connected to the full wave rectifier generally, indicated at 24, whose output voltage can be varied automatically in the way to be described. A return current path from voltage supply 24 to terminal 14 is provided by the conductor 26, which can be grounded as indicated.

When a load is applied across the output terminals 12 and 14 and increased current drawn therefrom, a variation in voltage across these terminals which would normally otherwise occur is compensated for first by an appropriate change in the voltage drop across series regulating transistor 18 and immediately thereafter by an increase or decrease in the direct voltage on the lead 22 which then permits the voltage drop across transistor 18 to return to a predetermined value. Direct voltage control signals in proper phase and amplitude necessary to maintain the output voltage on lead 16 and terminal 12 substantially constant are applied to transistor 18 through its base electrode 28 by the transistor 30. A negative increase in the potential of base electrode 28 relative to emitter 32 of transistor 18 causes an increased current flow between emitter and collector electrode 34, thus in effect lowering the series resistance of this transistor and acting to increase the potential difference between the output terminals 12 and 14, that is, to make terminal 12 more negative relative to terminal 14.

The signal which actuates transistor 30 to control the regulating transistor 18 is applied through the base electrode 36 of transistor 30 from the emitter electrode 38 of the transistor 40. The base electrode 42 of the latter is in turn connected via the lead 44 to the collector electrode 46 of the transistor 48. Minute variations in the voltage maintained on the output voltage lead 16 are sensed by transistor 48 through its base electrode 50 which is direct-current connected to lead 16 via the low resistance potentiometer 52. The emitter electrode 54 of transistor 48, which comprises a portion of the first stage of amplification in the signal feedback path from output lead 16 to series regulating transistor 18, is kept at a substantially constant potential relative to ground by a biasing arrangement whose action will be described shortly. When the output voltage on lead 16 begins to change (because of increased or decreased load on output terminals 12 or 14, for example) from the value to which it has been set, the incremental change in voltage is applied through potentiometer 52 to transistor 48, thence to transistor 40, and finally to transistor 30 to control the series resistance of transistor 18 thereby to maintain the voltage on output lead 16 effectively constant.

The direct-voltage bias level maintained on the base electrode of transistor 48 directly determines, through the feedback amplifiers just described, the output voltage on lead 16. To permit the bias voltage of this base electrode to be varied over a wide range without affecting the ability of transistor 48 to respond to incremental variations in the voltage on lead 16 caused by changes in load, i.e. to permit the bias level of base electrode 50 to be changed over a wide range but yet allow substantially the entire amplitude of any incremental variation in the voltage on lead 16 to act on transistor 48, low resistance potentiometer 52 is fed through its slider 56 with a current from a high resistance source so that the current remains substantially constant regardless of the setting of the slider along the potentiometer. Thus, when the slider is set in its topmost position the positive reference voltage relative to lead 16 applied to the base of transistor 48 will be minimum, whereas when the slider 56 is set in its lowest position, that is, when the full resistance of potentiometer 52 is connected between slider 56 and lead 16, the reference voltage applied to transistor 48 will be maximum and the difference in voltage between terminal 12 (output lead 16) and terminal 14 will be maximum. The current supplied to slider 56 is always effectively constant and is fed from a relatively high impedance source, for example one having an internal resistance of over one thundred times the resistance of potentiometer 52. Therefore, regardless of the setting of slider 56 along potentiometer 52 any incremental variation in the voltage on lead 16 is applied substantially directly and without attenuation to transistor 48.

Current is fed to slider 56 from the collector 60 of a transistor 61 whose base 62 and emitter 64 are held to a constant voltage difference by the action of the Zener diode 66 conducting in the reverse direction. Connected in series with emitter 64 is a small resistor 68 which in turn is connected to a positive voltage lead 70 which supplies current to transistor 61 and to Zener diode 66. This lead 70 connects to an auxiliary direct voltage supply, generally indicated at 72 whose voltage is regulated by the Zener diode 73 conducting in the reverse direction. A negative return from supply 72 is provided by the lead 74 which is connected directly to the positive output voltage lead 26 (terminal 14) of circuit 10. The base of transistor 61 and the cathode of Zener diode 66 are connected to negative lead 74 via the voltage dropping resistor 76. Since the potential difference between emitter and base of transistor 61 is held virtually constant by Zener diode 66, the current which flows from the transistor into slider 56, regardless of its setting, is substantially constant. Therefore, the power dissipation within transistor 61 is effectively constant and its operating temperature will be much more nearly constant than if the current through it were changed by the setting of slider 56. Thus another advantage of this biasing arrangement is in the elimination of "temperature drift" in the reference voltage setting, that is, drift caused by the warming or cooling of transistor 61 because of changes in the amount of power dissipated in it.

As mentioned previously emitter 54 of transistor 48 is kept at a substantially constant voltage relative to ground potential. This is accomplished by connecting emitter 54 to the emitter 80 of the transistor 82 whose base 83 is grounded, that is, connected to positive voltage lead 26. The common emitters of transistors 48 and 82 are fed from a constant current source, comprising transistor 84. The gain or amplification of transistor 48 is substantially increased by the action of transistor 82 since its collector electrode 86, connected by a load resistor 87 to lead 16, is also connected via the adjustable resistor 88 and the fixed resistor 89 to the base electrode of transistor 48. Because the impedance looking into the junction of base electrode 50 and potentiometer 52 remains substantially constant regardless of the setting of slider 56 along the potentiometer, the gain of transistor 48 in conjunction with transistor 82 is substantially unaffected by the setting of the slider of potentiometer 52.

To reduce the effective amplification of transistors 48 and 82 at higher frequencies, a capacitor 90 is connected between the base electrode of transistor 48 and output voltage lead 16. This prevents feedback of high frequency voltage from the collector of transistor 82 to the base of transistor 48. Another filter is connected for a similar reason between lead 44 and ground, this filter comprising resistor 91 and capacitor 92. Additionally as indicated by dotted lines, a capacitor 93 may be connected between lead 44 and the base of transistor 40 to effectively short-circuit at high frequencies the emitter and base of this transistor.

Operating bias currents to insure that the transistors 18, 30 and 40 operate at suitable quiescent points are provided by the resistors 94, 96, 98 and 100 connected to these transistors respectively as shown. Resistors 94, 96 and 98 have a common junction point which is connected to a positive output voltage lead 102 which in turn runs to an auxiliary voltage supply, generally indicated at 104. A negative return from this supply is provided by lead 106 which is connected directly to output voltage lead 16. Negative lead 106 likewise serves as the positive voltage lead from another auxiliary supply, generally indicated at 108, whose negative lead 110 connects, via resistor 100, to lead 44. The output voltage of supply 108 is regulated by a Zener diode 111 conducting in a reverse direction.

In order to safeguard circuit 10 from an overload, auxiliary voltage supply 108 is arranged so that, when the current through series regulating transistor 18 exceeds a safe maximum voltage, lead 110 will be effectively short-circuited to lead 106 thereby immediately blocking transistors 30 and 40 and driving transistor 18 effectively to cut-off. Under this condition no current can flow through transistor 18 even though a load is connected across output terminals 12 and 14. Any load current normally flowing through transistor 18 also passes through the small resistor 20 and develops a small voltage across it. When this voltage drop exceeds a maximum limit adjusted in accordance with the maximum current which can safely be allowed to flow through transistor 18, the relay coil 112, having a winding resistance represented by resistor 114 and which is connected in parallel with resistor 20 closes a quick acting single-pole switch 116 in auxiliary power supply 108. This grounds the base electrode 118 of a control transistor 120 to lead 106 and thereby effectively connects lead 110 directly to lead 106. When this happens, the current flowing between emitter and collector of series regulating transistor 18 drops effectively to zero. Of course when the current through this transistor drops below the maximum allowable value, switch 116 will be allowed to open. However, the base electrode of control transistor 120 remains for a short while thereafter effectively at the same potential as lead 106 because of the charging action of the large capacitor 122 which is connected between lead 106 and base electrode 118. Charging current for this capacitor flows through a large dropping resistor 124 from the rectifier 126 and the voltage transformer 128 of auxiliary supply 108. This charging of capacitor 122 to a value sufficient to permit unblocking of transistor 120, and hence transistor 18, can be made a relatively long time, for example, four seconds, and is enhanced by the gain of transistor 120 and bias resistor 98. This gives a delay which permits circuit 10 to be cleared of a momentary overload or a temporary short circuit for example. Even though the circuit is not cleared during the delay, when series regulating transistor 18 is again unblocked and begins to pass excessive load current, this will be permitted for only a brief instant, for example, one millisecond, before switch 116 is again closed and the above cycle of operation of the switch and capacitor 122 is repeated. A further advantage of this overload arrangement is that the maximum charging current which can be delivered to the large output filtering capacitor connected across terminals 12 and 14, will never exceed that maximum value determined by resistor 20 and relay coil 112.

During operation of circuit 10 when the output voltage on lead 16 is intentionally changed by varying the position of slider 56 along potentiometer 52, the circuit acts to adjust the voltage on lead 16 to the new value desired. Assuming at first that the voltage on lead 22 always remains constant at a value for example of 36 volts, when the voltage on lead 16 is reduced, for example, from 30 volts to 2 volts the voltage drop across series regulating transistor 18 will have to increase from six volts to 34 volts. This is very undesirable since the increased voltage drop, even at no load, may exceed safe limits; moreover even if the voltage across transistor 18 were to increase only moderately the amount of current which could be allowed to pass through it would have to be decreased accordingly to maintain the power dissipation within safe limits since transistors are quickly destroyed by excessive voltage and current. Therefore, in order to keep the voltage drop between the emitter and the collector of transistor 18 substantially constant at a chosen value, regardless of the voltage on output lead 16 and of the load current being drawn from the circuit, the voltage applied to lead 22 is varied. To this end the rectifiers 132 and 134 of voltage supply 24 are connected through a magnetic amplifier, generally indicated at 136, to a conventional voltage transformer 138 whose center tap is connected to positive output lead 26. Magnetic amplifier 136 includes the two regulating windings 140 and 142 connected respectively in series with rectifiers 132 and 134 and transformer 138. The voltage drops across these windings can be controlled by the respective control windings 144 and 146 to vary the alternating voltage applied to the rectifiers and hence the direct voltage on lead 22 as required to keep the voltage drop across transistor 18 constant. Control winding 144 is energized from the transistor 150 whose base electrode is connected directly to output voltage lead 16. The emitter electrode of transistor 150 is connected through the biasing resistor 152 to the positive voltage supply lead 102 and is also connected through the voltage regulating Zener diode 154 to the collector 34 of transistor 18. Any variation in voltage between emitter and collector of transistor 18 is amplified by transistor 150 and then applied to control coil 144 in proper phase and magnitude to adjust the voltage drop across regulating winding 140 and thereby control the direct voltage on lead 22 that value required to keep the voltage drop across transistor 18 constant. Control winding 146 of magnetic amplifier 136 is connected in series with the rheostat 156 between output voltage leads 16 and 26. Any change in potential between these leads thus controls the voltage drop across regulating winding 142. By selecting the ampere-turns of control winding 146 relative to winding 144, the operating range of winding 144 can be kept roughly constant even with wide variations in the voltage on lead 22.

In order to provide a current return when the voltage differences between terminals 12 and 14 is set at its minimum value and when there is no current being drawn by an external load, a small non-linear internally connected load is wired between terminals 12 and 14. This load comprises a resistor 166 and an incandescent light bulb 168 having a wire filament 170 whose resistance changes with change in current through it. However, even with this internal load connected in circuit, the power handling efficiency of the circuit, that is, the ratio of output power to input power, at full load and maximum voltage, is of the order of 85%.

Provided as an alternative to the magnetic amplifier shown in Figure 1, is a manually controlled variable transformer arrangement illustrated in Figure 2. This includes a variable auto transformer 160 whose output voltage is applied to transformer 138 and thence directly to rectifiers 132 and 134 to generate the direct voltage on lead 22. The magnitude of this direct voltage is therefore determined by the setting of the slider 162 of the variable transformer. This slider can be ganged with slider 56 of potentiometer 52 so that the sliders move in unison and change the settings of transformer 160 and potentiometer 52 linearly. Thus, for example, when the output voltage on lead 16 is decreased, by the setting of potentiometer 52, from 30 volts to 2 volts the direct voltage applied to lead 22 by transformer 160 will be decreased from 36 volts to 8 volts thereby maintaining the voltage drop, for a given current, across transistor 18 at 6 volts.

In a voltage regulating circuit substantially identical to that shown in Figure 1 which has been built and successfully operated, the following elements, resistances, capacitances, currents and voltages were employed; voltage at terminal 12, variable from 30 to 2 volts negative relative to terminal 14; voltage from supply 104, 45 volts; voltage between leads 70, 74, about 18 volts; transistor 18, 2N174; resistor 20, 1 ohm; voltage on lead 22, variable 36 to 8 volts; transistor 30, 2N251; transistor 40, 2N44; transistors 48 and 82, each 2N44; transistors 61, 84 and 120, each TI301; diodes 66 and 154, 5.2 volts drop; diodes 73 and 111, approximately 20 volts drop; output impedance of transistor 61, of the order of 1 megohm; potentiometer 52, 5000 ohms; resistor 88, 50,000 ohms; resistor 89, 24,000 ohms; capacitor 90, 1 microfarad; resistor 94, 2000 ohms; resistor 96, 10,000 ohms; resistor 98, 75,000 ohms; resistor 100, 7,500 ohms; resistor 68, 510 ohms; resistor 166, 43 ohms; and light 168, GE 1820. The voltage regulating efficiency of this circuit is exceptional, the voltage on output lead 16 can be held within 0.01 volt at 30 volts for any load from zero to 2.5 amperes. A change in the alternating voltage input from 105 to 125 volts causes only 0.01 volt change at 30 volts in the output voltage on lead 16. The ripple voltage across the output terminals 12 and 14 is of the order of 500 micro-volts.

The above description of the invention is intended in illustration and not in limitation thereof. Various changes may occur to those skilled in the art and these may be made without departing from the spirit or scope of the invention as set forth.

I claim:

1. In a wide range voltage regulating circuit of the character described, a pair of input voltage leads, a pair of output voltage leads, a current conducting device connected in series with an input and an output lead and having a control electrode, an amplifying network connected between said control electrode and an output lead to sense variations in the output voltage between said output leads and apply a signal to said electrode in proper phase and magnitude to keep said output voltage substantially constant, said network including a first amplifying device having an input electrode, a relatively low ohmage variable resistor connecting said input electrode directly to an output voltage lead, and high impedance constant current supply means connected to said variable resistor for biasing said amplifying device whereby changing the value of said resistor changes said output voltage but variations in said voltage are applied substantially without attenuation to said first amplifying device.

2. The combination of elements as in claim 1 wherein said constant current supply means includes a current supply transistor connected to supply to said variable resistor a current which is substantially constant regardless of the ohmage of said resistor.

3. The combination of elements as in claim 1 wherein said first amplifying device is a first transistor and said input electrode is the base of said transistor, and wherein the emitter electrode of said first transistor is connected in common with the emitter electrode of a second transistor the base of which is biased by a substantially constant voltage, the collector of one of said first and second transistors being connected through a resistor directly to the base of the other of said first and second transistors to increase the gain thereof substantially.

4. The combination of elements as in claim 1 in further combination with overload prevention means, said overload means including a large capacitor and resistor adapted to be connected to said amplifier network to cut off said current conducting device, and a switch controlled by the current in said output lead to connect said capacitor and resistor in circuit, the effective charging time of said capacitor serving to delay the passage of current through said device.

5. The circuit in claim 1 wherein said variable resistor is linearly variable, and said input voltage leads are supplied by a source which includes a variable transformer whose output is linearly variable in accordance with the position of a control member, said member and said variable resistor being mechanically connected together, whereby the output voltage of said circuit is proportionally changed with the voltage from said source.

6. An improved voltage regulating circuit of the character described comprising two output leads, a power source of unregulated direct voltage and current, means including an electrically variable device connecting said source to said leads, said device having a control terminal, and means including an electronic differential amplifier connected between said output leads and said control terminal to sense very small variations in the output voltage across said leads and to amplify the variations and apply them in proper phase to said control terminal to maintain said output voltage substantially constant at a predetermined value, said electronic amplifier including a first transistor and a second transistor each of which has two main electrodes and a control electrode, said transistors being connected together as a differential amplifier with a main electrode of one transistor and a main electrode of the other transistor connected together, current conductive means connecting the main electrodes and a control electrode of said transistors to at least one of said output leads, a relatively low resistance potentiometer having a slider and connecting the remaining control electrode of said transistors to an output lead, and relatively high impedance current supply means for supplying a substantially constant current to the slider of said potentiometer, whereby the regulated output voltage across said leads can be adjusted in accordance with the setting of said potentiometer and the coupling of said remaining control electrode to an output lead through said low resistance potentiometer is substantially unattenuated and independent of the setting of said slider.

7. The circuit as in claim 6 wherein said potentiometer is linearly variable, and said source includes a variable transformer whose output is linearly variable in accordance with the position of a control knob, and in further combination with means mechanically interconnecting the slider of said potentiometer with said transformer control knob, whereby the problem of making the voltage from said source track linearly with said output voltage is eliminated.

8. In an improved voltage regulating power supply having two output leads across which the voltage is to be regulated to very close limits of any chosen value within a wide range, an improved, highly stable and efficient input amplifier and bias adjusting arrangement comprising a first transistor and a second transistor each having two main electrodes and a control electrode, a low ohmage variable resistor connecting the control electrode of said first transistor to one of said output leads, current conductive means interconnecting the remaining electrodes of said transistors as a differential amplifier and coupling the control electrode of second transistor to the other of said output lead, and high impedance means for supplying a substantially constant current to said variable resistor, the value of said resistor determining said output voltage, whereby the coupling of said differential amplifier to said output leads is effectively independent of the value of said low ohmage variable resistor, and said output voltage can be set to any value within a wide range.

9. A wide range voltage regulating circuit comprising a pair of input leads adapted to be energized by an unregulated direct voltage, a pair of output leads between which an output voltage is to be maintained at a closely regulated value, a variable resistance regulating device connected in series with an input lead and an output lead, said device having a control terminal and being variable to keep the voltage between the output leads substantially constant, an amplifying network connected between said control terminal and said output leads to sense variations in said output voltage and to apply an amplified signal to said regulating device in proper phase and magnitude to keep said output voltage substantially constant, said network including a transistor having a low impedance input, and variable bias means connected to said transistor for adjustably setting said output voltage over a wide range, said bias means including low ohmage resistor means connecting said transistor directly to one output lead, and high resistance current supply means connected to said resistor means to develop in combination therewith an adjustable bias voltage, whereby said transistor can be variably biased and substantially the entire variation in voltage on said one output lead is applied to said transistor input regardless of the value of said adjustable bias voltage.

References Cited in the file of this patent

UNITED STATES PATENTS

| | | |
|---|---|---|
| 2,117,138 | Bock | May 10, 1938 |
| 2,568,172 | Spencer | Sept. 18, 1951 |
| 2,573,744 | Trucksess | Nov. 6, 1951 |
| 2,693,568 | Chase | Nov. 2, 1954 |
| 2,697,811 | Deming | Dec. 21, 1954 |
| 2,751,549 | Chase | June 19, 1956 |
| 2,832,900 | Ford | Apr. 29, 1958 |